United States Patent
Griffin et al.

(10) Patent No.: US 6,842,169 B2
(45) Date of Patent: Jan. 11, 2005

(54) HAND-HELD ELECTRONIC DEVICE WITH MULTIPLE INPUT MODE THUMBWHEEL

(75) Inventors: Jason T. Griffin, Waterloo (CA); Chao Chen, Kitchener (CA)

(73) Assignee: Research In Motion Limited, Waterloo (CA)

( * ) Notice: Subject to any disclaimer, the term of this patent is extended or adjusted under 35 U.S.C. 154(b) by 308 days.

(21) Appl. No.: 10/038,314

(22) Filed: Oct. 19, 2001

(65) Prior Publication Data

US 2003/0076292 A1 Apr. 24, 2003

(51) Int. Cl.[7] .................................................. G09G 5/08
(52) U.S. Cl. ..................... 345/163; 345/164; 345/184; 341/35
(58) Field of Search .............................. 345/156–157, 345/163–169, 184, 784–786; 341/35; 200/11 R, 11 TW; D14/244, 333, 402, 417

(56) References Cited

U.S. PATENT DOCUMENTS

| | | | |
|---|---|---|---|
| 5,825,353 A | * | 10/1998 | Will ............................ 345/184 |
| 5,912,661 A | * | 6/1999 | Siddiqui ..................... 345/166 |
| 5,915,228 A | | 6/1999 | Kunihiro et al. |
| 5,931,873 A | | 8/1999 | Cisar |
| 5,963,197 A | | 10/1999 | Bacon et al. |
| D416,256 S | | 11/1999 | Griffin et al. |
| D433,460 S | | 11/2000 | Griffin et al. |
| 6,256,011 B1 | * | 7/2001 | Culver ........................ 345/157 |
| 6,278,442 B1 | | 8/2001 | Griffin et al. |
| 6,297,795 B1 | | 10/2001 | Kato et al. |
| 6,396,482 B1 | | 5/2002 | Griffin et al. |
| D460,493 S | | 7/2002 | Griffin et al. |
| 6,452,588 B2 | | 9/2002 | Griffin et al. |
| 6,489,950 B1 | | 12/2002 | Griffin et al. |
| D473,226 S | | 4/2003 | Griffin |
| 6,608,616 B2 | * | 8/2003 | Lin ............................. 345/163 |
| 6,611,254 B1 | | 8/2003 | Griffin et al. |
| 2002/0158844 A1 | * | 10/2002 | McLoone et al. ........... 345/163 |

* cited by examiner

*Primary Examiner*—Amare Mengistu
*Assistant Examiner*—Ricardo Osorio
(74) *Attorney, Agent, or Firm*—Jones Day; Krishna K. Pathiyal; Robert Liang

(57) ABSTRACT

A thumbwheel input device oriented on an incline and comprising a wheel such that a first input is generated by rotation of the wheel about its axis, and a holder also having an axis of rotation and a portion thereon to receive the wheel whereby a second input is generated by rotation of the holder about the second axis.

8 Claims, 8 Drawing Sheets

HAND-HELD ELECTRONIC DEVICE WITH MULTIPLE INPUT MODE THUMBWHEEL

BACKGROUND OF THE INVENTION

1. Field of the Invention

This invention relates to handheld electronic devices ("mobile devices") having an auxiliary input device. Specifically this invention relates to auxiliary input devices such as multiple input mode thumbwheels.

2. Description of the Prior Art

In most mobile devices with a thumbwheel input, the thumbwheel is oriented so that the thumbwheel would be accessed on a horizontal axis or a vertical axis to the mobile device's housing. A horizontal orientation of a thumbwheel, in relation to the device housing, takes up significant space on the printed circuit board of the device (herein referred to as PCB). A vertical orientation of a thumbwheel, in relation to the device housing adds significant overall thickness to the device and device housing or undesirable protrusion from the housing.

SUMMARY OF THE INVENTION

It is an object of the invention to provide a thumbwheel input device characterized by a wheel having a first axis of rotation whereby a first input is generated by rotation of the wheel about the first axis, and a holder having a second axis of rotation and a portion thereon to receive the wheel whereby a second input is generated by rotation of the holder about the second axis.

In one aspect of the invention, a mobile device includes a thumbwheel as an embodiment of an auxiliary input device. In most mobile devices with a thumbwheel input, the thumbwheel is oriented so that the thumbwheel would be accessed on a horizontal axis or a vertical axis to the mobile device's housing. In this embodiment of the device, the thumbwheel is oriented on an incline from the vertical in order to maximize PCB real estate. Orienting the thumbwheel on an incline will optimise the amount of space on the PCB and the thickness of the device housing.

Further features of the invention will be described or will become apparent in the course of the following detailed description.

BRIEF DESCRIPTION OF THE DRAWINGS

In order that the invention may be more clearly understood, the one or more embodiments thereof will now be described in detail by way of example, with reference to the accompanying drawings, in which.

DETAILED DESCRIPTION OF THE PREFERRED EMBODIMENT

Figure 1:
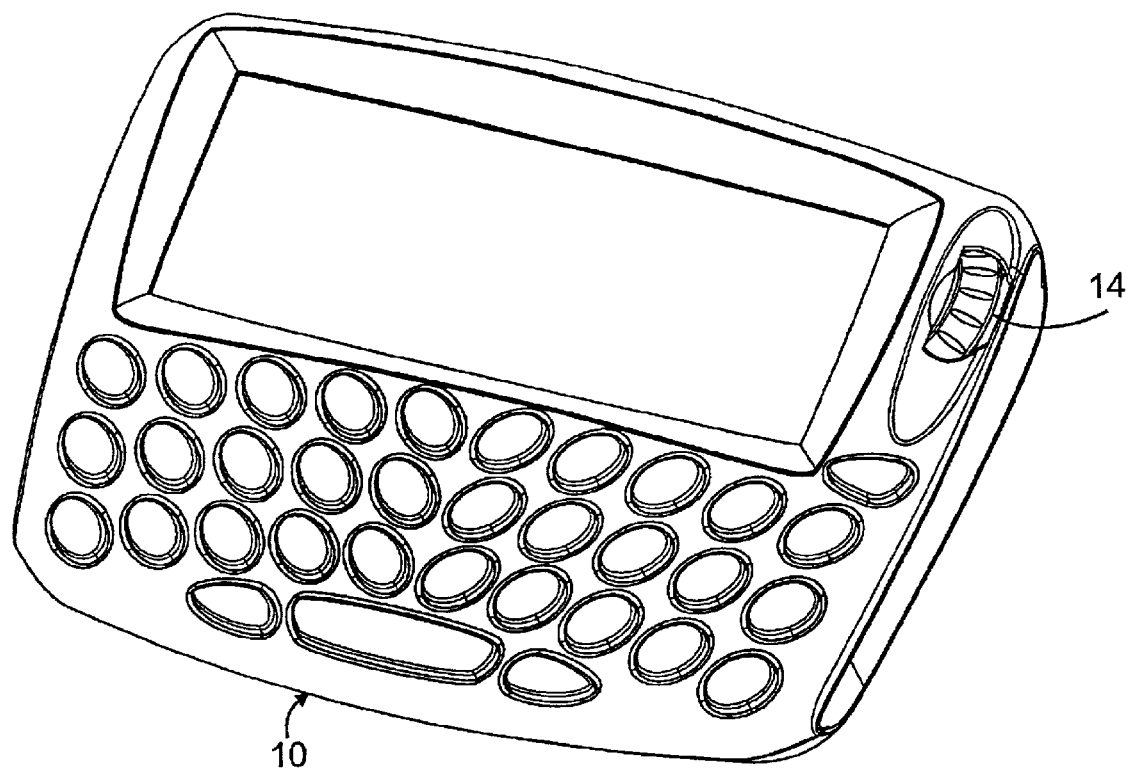
FIG. 1 is a top view of the device with a multiple input mode thumbwheel.

FIG. 1 is a top view of an embodiment of the device with a multiple input mode thumbwheel. In this embodiment, the thumbwheel 12 is displaced on an incline from the vertical of the face of the mobile device housing 10. The wheel 14 protrudes through the device housing 10.

Figure 2:
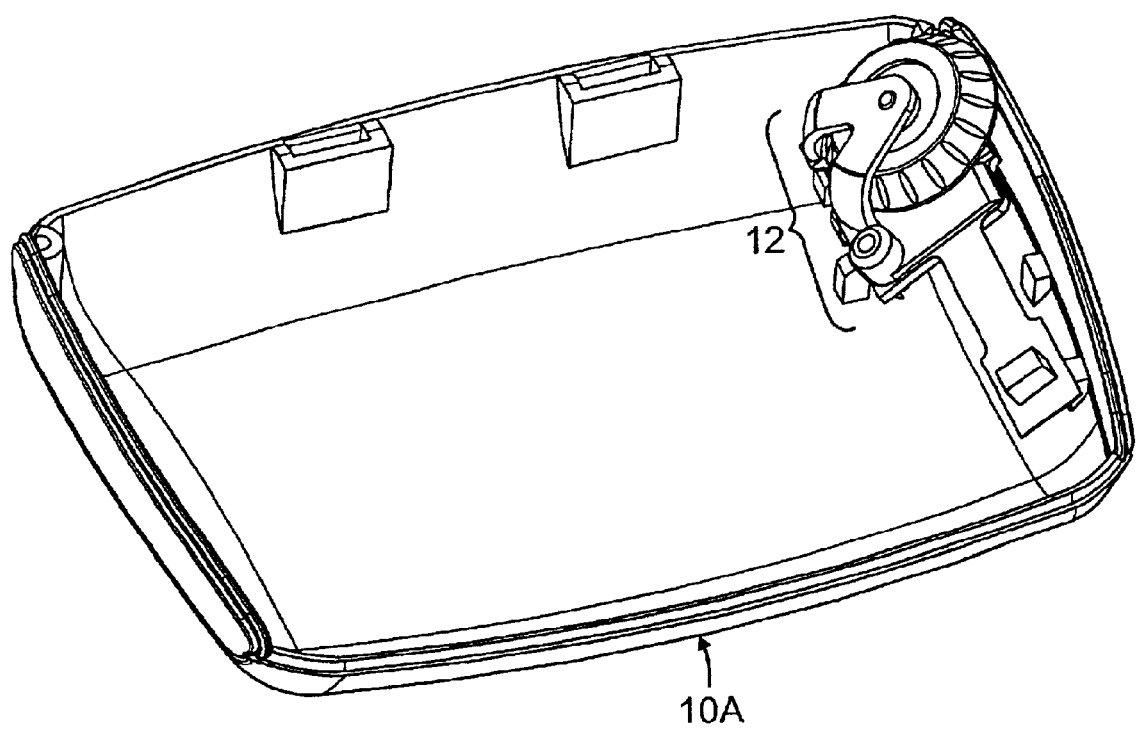
FIG. 2 is a cut-away view of the device showing the location of the thumbwheel.

FIG. 2 is a cut-away view of the device showing a preferred location of the thumbwheel 12. The PCB and other associated components that cooperate with the thumbwheel 12 to receive and react to input provided via the thumbwheel are not shown. This drawing shows the bottom 10A of the device housing and the placement of the thumbwheel 12 assembly within the housing.

Figure 3:
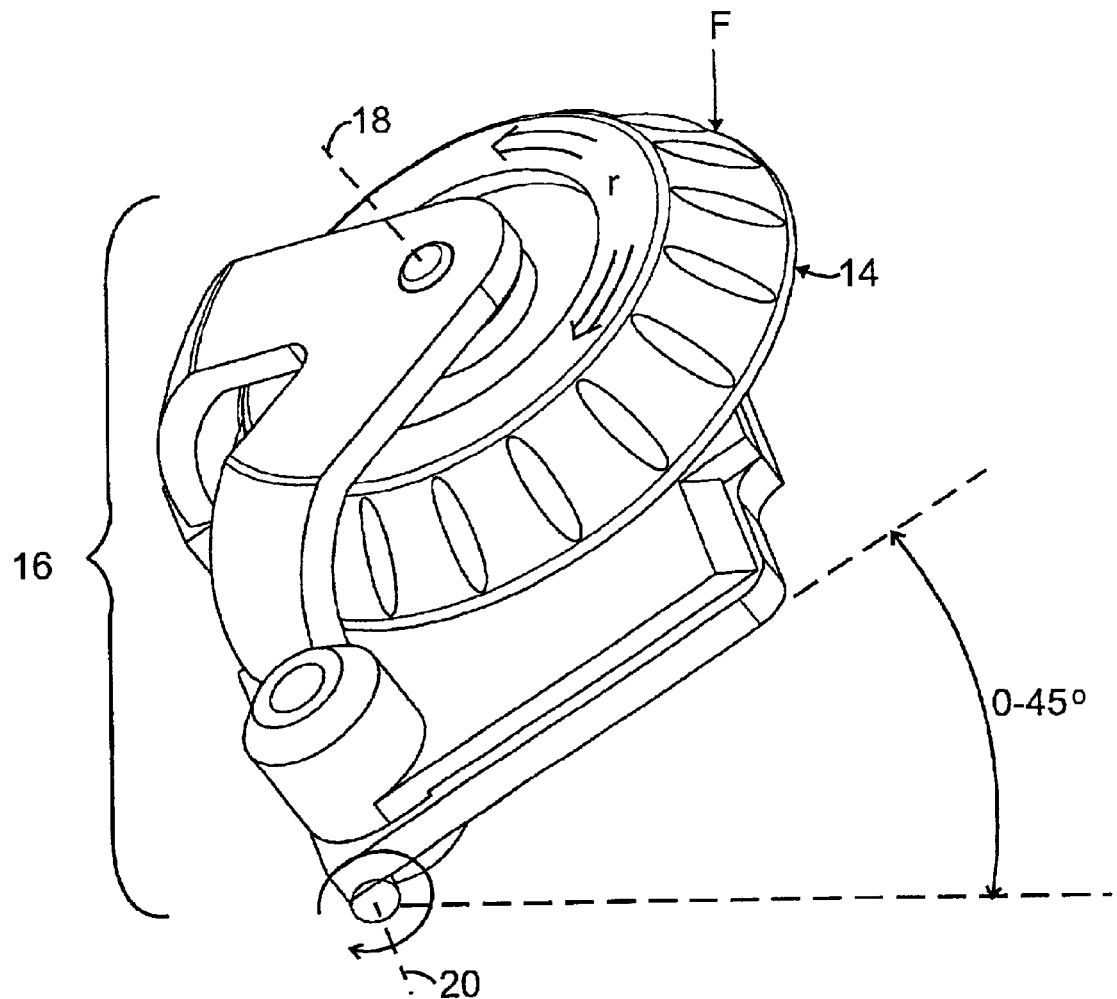
FIG. 3 is a detailed diagram of the top of the thumbwheel assembly describing the modes of movement of the thumbwheel.

FIG. 3 is a detailed diagram of the top view of the thumbwheel assembly describing the modes of movement of the thumbwheel. In this embodiment, the wheel 14 sits in the holder 16, which is oriented on an angle from the horizontal plane 19 of the device housing 10. In a preferred embodiment, this angle may be within a range of 0 to 45 degrees from the horizontal plane 19 to provide optimum space for PCB and PCB components, to reduce overall thickness of the device housing 10, and to be optimised for use with the user's thumbs.

The user may make inputs with the thumbwheel by rotating the wheel 14 in clockwise or counterclockwise directions around the thumbwheel's axis of rotation 18, as illustrated by the rotation r, or by pressing down on the wheel, as illustrated by force F. In traditionally oriented thumbwheel inputs, the thumbwheel is pressed down toward the back of the device. Because the thumbwheel assembly is tilted on an angle in this embodiment, a second axis of rotation 20 exists along the bottom of the thumbwheel assembly 12. When the user presses the exposed part of the wheel 14 from a first position, down toward the back of the device, the thumbwheel 12 translates to a second position approximately 0.5 mm downward. This motion of pressing downward onto the thumbwheel causes the thumbwheel to rotate around the second axis of rotation 20 in a rocking or seesaw motion, as illustrated by the rotation R. The movement of the thumbwheel in this direction is limited by the thumbwheel holder 16 and the device housing 10.

Figure 4:
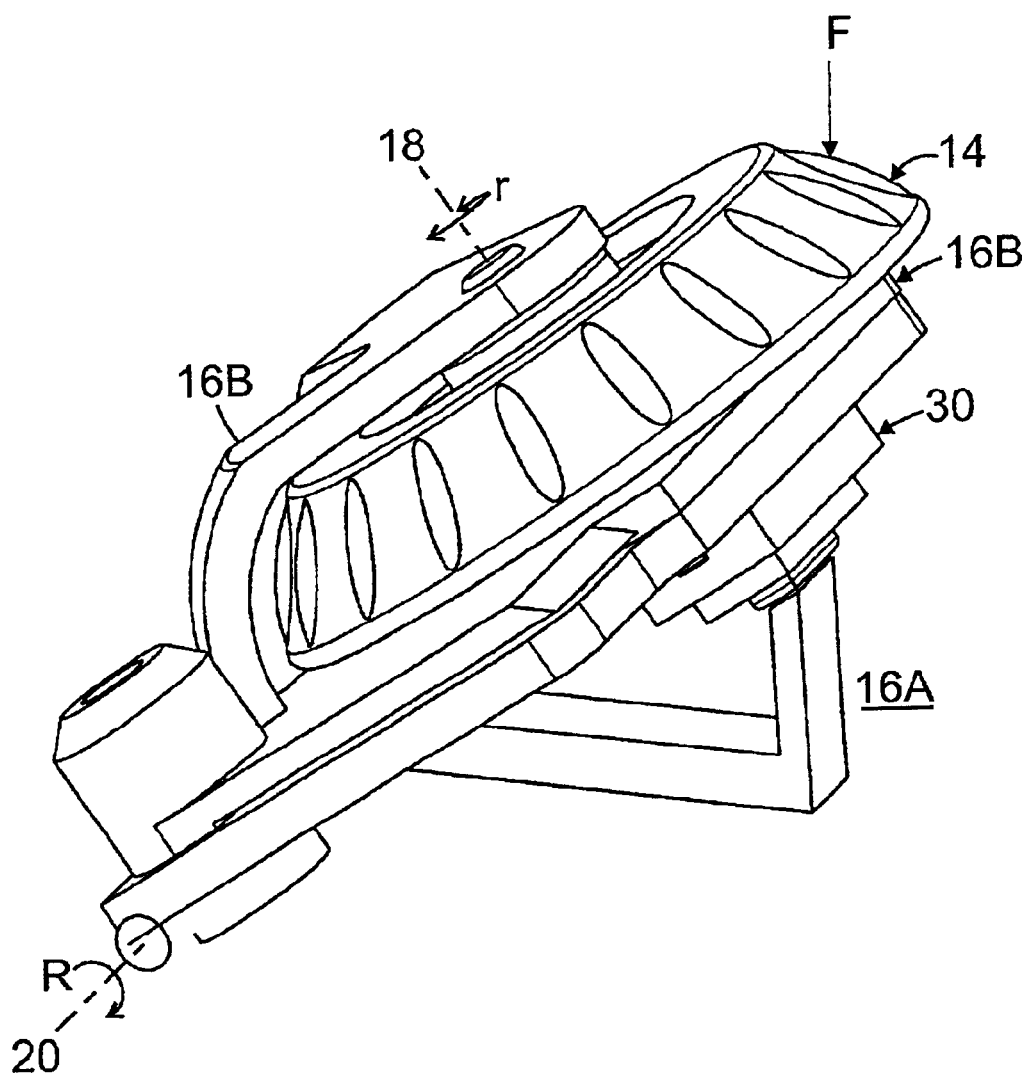
FIG. 4 is a side view of the thumbwheel assembly.

FIG. 4 is a side view of the thumbwheel assembly. This view shows the bottom of the thumbwheel holder 16. An arm 16A, comprising a base portion and an arm portion, extends around the bottom of the assembly towards the holder for the purpose of engaging the bottom of the holder 16 and activating an input. Between the arm 16A and the holder 16 is a tactile switch 30. When the user presses down on the exposed part of the wheel, the wheel 14 is stopped by the arm 16A of the holder 16 and the tactile switch 30. The tactile switch 30 is thus activated, receiving an input and the arm 16A acts as a stop. The tactile switch 30 may be either attached to the bottom of the holder to engage the arm, or it may be attached to the arm to engage the bottom of the holder.

A further embodiment of the invention would be to eliminate the arm on the holder. In this example, part of the device housing may be used to perform the stop function of the arm. The device housing may have a protrusion on which the assembly may sit so that the tactile switch may be attached to the protrusion or if the tactile switch is on the bottom of the assembly, it may engage the protrusion.

Figure 5:
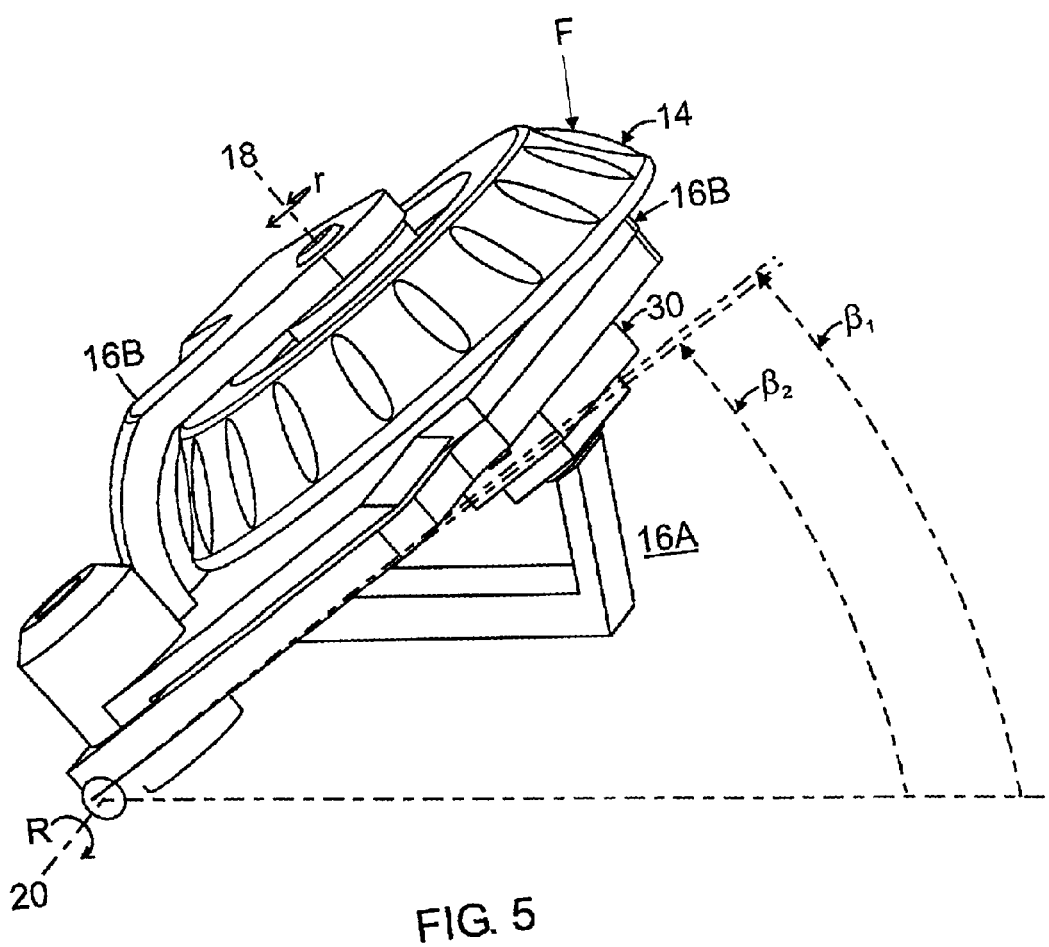
FIG. 5 shows the translation of the thumbwheel assembly from a first position to a second position.

FIG. 5 shows the translation of the thumbwheel assembly from a first position to a second position. When the user presses down on the wheel 14 in the direction of F, the thumbwheel assembly 12 moves from a first position $\beta_1$ to a second position $\beta_2$ around the second axis of rotation 20. When the user releases the wheel 14, the thumbwheel assembly 12 returns to the first position $\beta_1$. The translation in the direction of the force F is such that the thumbwheel assembly 12 will engage the tactile switch 30 to detect or receive an input.

Figure 6:
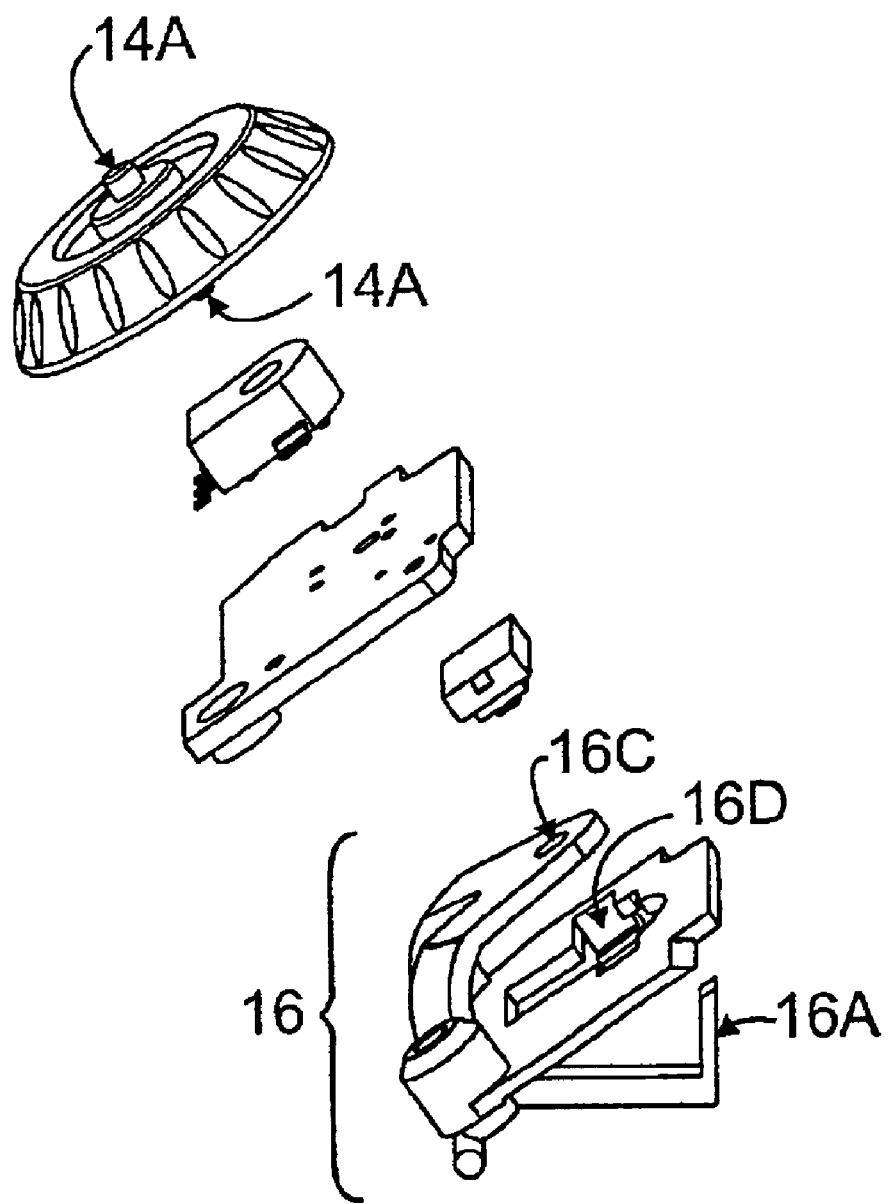
FIG. 6 is an exploded view of the thumbwheel assembly detailing the components of the thumbwheel assembly.

FIG. 6 is an exploded view of the thumbwheel assembly. The wheel 14 sits on a rotating encoder switch 34 such that the lower axle 14A of the wheel 14 sits in an recess on the rotating encoder switch 34 allowing the wheel to rotate around its axis of rotation 18. This switch detects inputs to the device whenever the wheel is rotated around the wheel's axis of rotation 18. This switch is attached to the thumbwheel assembly PCB 32. The thumbwheel assembly PCB 32 attaches to the device PCB by a flex circuit (not shown in this view). These parts fit into the thumbwheel holder 16 such that the wheel 14 and the rotatable encoder switch 34 is supported by a U-shaped bracket 16B. The upper axle 14A of the wheel fits into the provided aperture 16C in the upper bracket of the U-shaped bracket 16B and the rotatable encoder 34 switch fits into the provided indentation 16D in the lower bracket of the U-shaped bracket 16B. The rotatable encoder switch 34 attaches to the thumbwheel assembly PCB 32, which is placed on the under side of the lower bracket of the U-shaped bracket 16B. The thumbwheel assembly PCB 32 is in contact with the tactile switch 30 on the opposite side of this PCB than the rotatable encoder switch 34. The tactile switch engages the holder arm 16A in order to limit the movement of the thumbwheel about the holder's axis of rotation 20.

Figure 7:
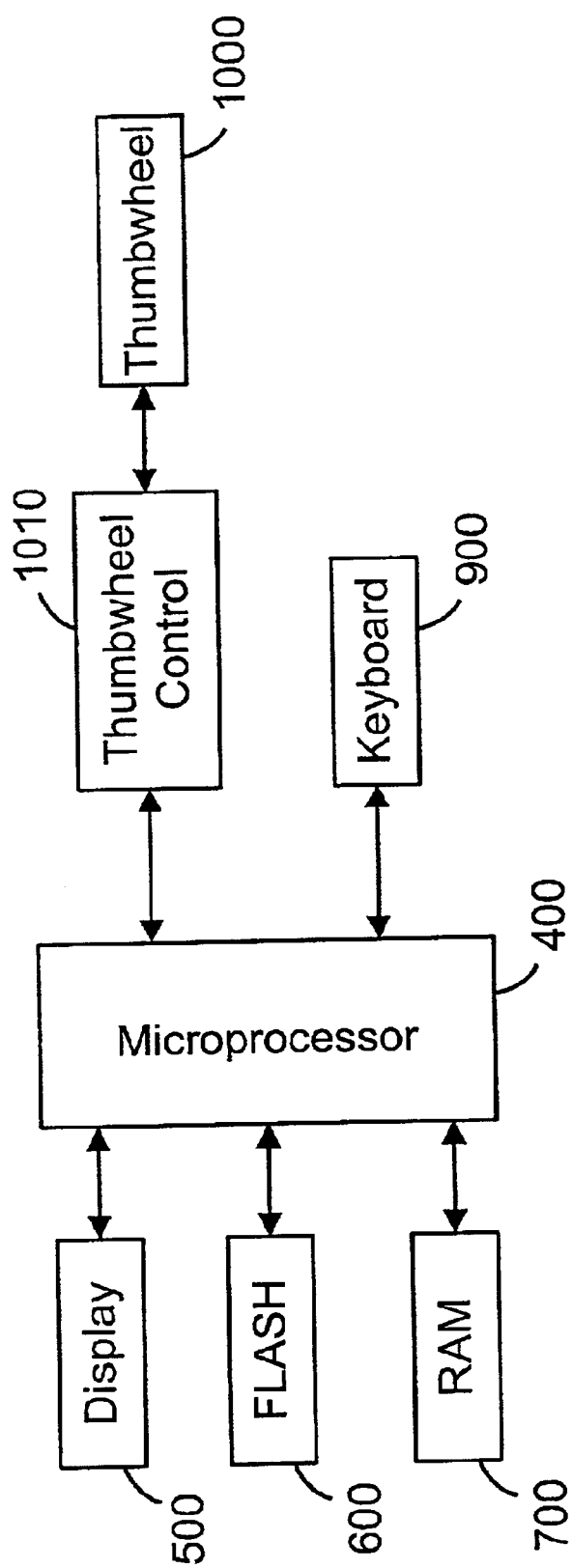
FIG. 7 is a block drawing for the thumbwheel input for a handheld electronic device.

FIG. 7 is a general block diagram depicting the inputs of a typical handheld electronic device. A typical handheld electronic device would usually include a microprocessor 400 that controls the components of the device such as a display, FLASH memory 600, RAM 700, and inputs in the form of a keyboard 900, and an auxiliary input such as a thumbwheel 1000 which would include thumbwheel control logic 1010.

Figure 8:
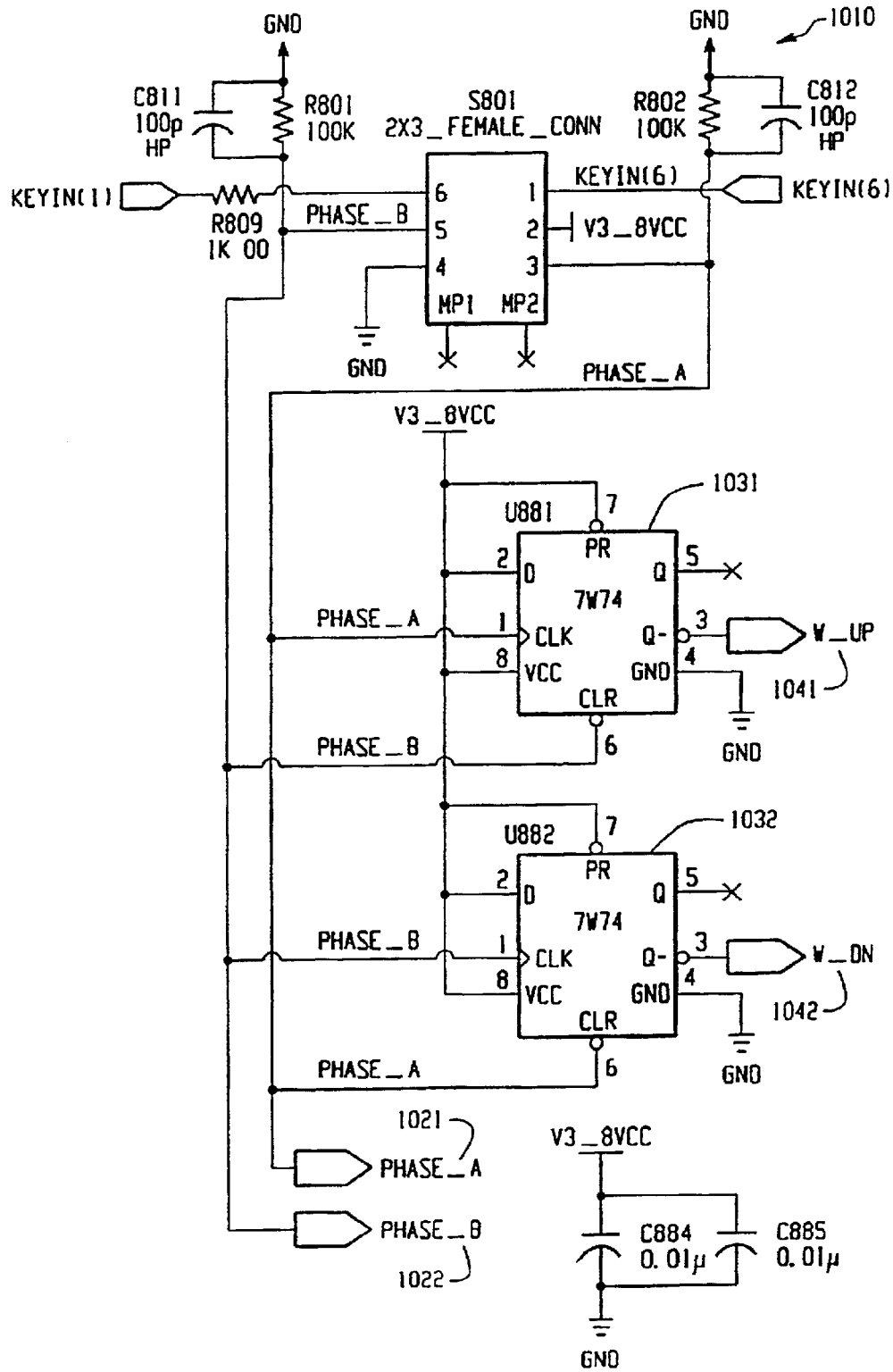
FIG. 8 is a typical example of a circuit for a thumbwheel input.

FIG. 8 is an example of typical logic circuitry 1010 associated with thumbwheel 1000. This diagram is meant for example purposes only and as one skilled in the art would understand, logic circuitry for a thumbwheel is not limited to this example. Thumbwheel 1000 outputs quadrature signals phase A 1021 and phase B 1022, which are processed by D flip-flops 1031 and 1032 to present signals 1041 W_UP and 1042 W_DN to microprocessor 400. Signals 1041 and 1042 represent, respectively, a user rolling the thumbwheel up and rolling the thumbwheel down. Preferably, another detectable input movement from the thumbwheel is desirable. One such input movement implementation would produce an additional input signal derived from pushing the thumbwheel toward the rear of the device. Hence, the thumbwheel of the present invention has preferably measurable rotatable and depressible input movements. Although the description that follows is specifically relating to a thumbwheel input device, it is to be understood that other suitable thumb-based auxiliary input devices having multiple input detectable movements are envisioned and well within the scope and spirit of the present invention.

Another embodiment of this circuitry may have the functionality of the D flip-flops 1031 and 1032 embedded within the processor.

It will be appreciated that the above description relates to the preferred embodiment by way of example only. Many variations on the invention will be obvious to those knowledgeable in the field, and such obvious variations are within the scope of the invention as described and claimed, whether or not expressly described.

We claim:

1. A thumbwheel input device for a handheld electronic device with a housing, in an inclined orientation, comprising:
   a. a wheel that has an axle rotating around a first axis of rotation, and that partially protrudes through the device housing on an incline;
   b. a rotating encoder switch that receives a first input when the wheel rotates about its first axis, and that has an aperture in which the wheel axle sits;
   c. a printed circuit board with a first side and second side, with the rotating encoder switch attached to the first side of the printed circuit board;
   d. a holder, having a second axis of rotation, that contains the wheel, the printed circuit board, and the rotating encoder switch, and that is oriented on an incline;
   e. a tactile switch, attached to the second side of the printed circuit board, for receiving a second input; and
   f. a stop that engages the tactile switch for receiving a second input about the second axis of rotation.

2. The thumbwheel input device of claim 1 wherein the stop is an arm attached to the bottom of the holder that extends up toward the tactile switch.

3. The thumbwheel device of claim 1 wherein the stop is a protrusion from the device housing that extends up toward the tactile switch.

4. A thumbwheel input device for a handheld electronic device with a housing, in an inclined orientation, comprising:
   a. a wheel that is rotatable about a first axis of rotation and that partially protrudes through the device housing on an incline;
   b. a printed circuit board;
   c. a rotating encoder switch attached to the printed circuit board and operatively engaged with the wheel to receive an input when the wheel rotates about its first axis; and
   d. a holder, having a second axis of rotation, that holds the wheel, the printed circuit board, and the rotating encoder switch, and that is oriented on an incline.

5. The thumbwheel input device of claim 4 further comprising a tactile switch attached to the printed circuit board for movement about the second axis of rotation with the wheel, the printed circuit board, and the rotating encoder switch.

6. The thumbwheel input device of claim 5 further comprising a stop that engages the tactile switch to actuate the tactile switch and to limit movement of the tactile switch about the second axis of rotation.

7. The thumbwheel input device of claim 6 wherein the stop is an arm that is attached to the bottom of the holder and that extends up toward the tactile switch.

8. The thumbwheel input device of claim 6 wherein the stop is a protrusion from the device housing that extends up toward the tactile switch.

* * * * *